(12) United States Patent
Nomura

(10) Patent No.: US 6,998,544 B2
(45) Date of Patent: Feb. 14, 2006

(54) ROLL-TOP SHIELD FOR WEIGHING SCALES

(75) Inventor: Misao Nomura, Tokyo (JP)

(73) Assignee: Shinko Denshi Co., Ltd., Tokyo (JP)

( * ) Notice: Subject to any disclaimer, the term of this patent is extended or adjusted under 35 U.S.C. 154(b) by 170 days.

(21) Appl. No.: 10/757,568

(22) Filed: Jan. 15, 2004

(65) Prior Publication Data

US 2004/0144574 A1   Jul. 29, 2004

(30) Foreign Application Priority Data

Jan. 16, 2003   (JP) .............................. 2003-008421

(51) Int. Cl.
*G01G 21/28*   (2006.01)

(52) U.S. Cl. ...................... 177/181; D10/94
(58) Field of Classification Search ................ 177/180, 177/181, 238–244
See application file for complete search history.

(56) References Cited

U.S. PATENT DOCUMENTS

| | | | | |
|---|---|---|---|---|
| 4,798,250 A | * | 1/1989 | Knothe et al. | 177/181 |
| 4,862,978 A | * | 9/1989 | Borchard | 177/180 |
| 4,862,979 A | * | 9/1989 | Borchard | 177/181 |
| D312,051 S | * | 11/1990 | Meixner | D10/91 |
| D493,378 S | * | 7/2004 | Nomura | D10/94 |
| 2004/0035614 A1 | * | 2/2004 | Zhang | |
| 2004/0144574 A1 | * | 7/2004 | Nomura | |

* cited by examiner

*Primary Examiner*—Randy W. Gibson
(74) *Attorney, Agent, or Firm*—Posz Law Group, PLC

(57) ABSTRACT

A roll-top shield for weighing scales including a stationary hood 11 and a rotatable hood 12, both being made of a transparent material. Right and left side walls of the rotatable hood 12 are rotatably secured to right and left side wall of the stationary hood 11, respectively by means of pins 13*a* and 13*b*, respectively extending in the horizontal direction. By rotating the rotatable hood 12 over the stationary hood 11, an opening having a large size can be obtained, and a large or elongated article can be easily put on and off a weighing dish of a weighing device through the opening. When the rotatable hood is stopped at any desired position between a closed position and an open position without holding by hand, the opening having a desired size can be obtained, while both hands of a user are free.

4 Claims, 2 Drawing Sheets

ROLL-TOP SHIELD FOR WEIGHING SCALES

BACKGROUND OF THE INVENTION

The present invention relates to a roll-top shield for weighing scales such as electronic scales in order to shield the air outside for precise measuring of an article.

In order to measure weights of articles very precisely, there have been developed various kinds of electronic scales. In such electronic scales having a high sensitivity, weighing of articles must be done sometimes under the condition that articles are shielded and isolated from the outside atmosphere by means of a shield to a certain extent in order to avoid the influence of a wind pressure or a surrounding turbulent air stream.

There have been proposed various kinds of shield for weighing scales. The known shields may be classified into a box type, a cylinder type and a sphere or semi-sphere type. In the box type shield, right and left sliding doors are provided in a front wall, and either one of the right and left sliding doors is slid horizontally to form an opening through which an article to be weighed is put on and off a weighing dish.

In the known box type shield mentioned above, an area of the opening is limited to be at most an area of a single sliding door, and an article having a large volume or a long length could not be put on a weighing dish through the opening.

In another known shield in forms of a cylinder having an axis extending vertically or a sphere, a sufficiently large inner volume could not be formed within the shield, and therefore large size articles could not be measured.

SUMMARY OF THE INVENTION

The object of this invention is to solve the above-mentioned problems and provide a roll-top shield for weighing scales, wherein a large inner volume can be attained within the shield and large or elongated articles can be easily carried in and out of the shield through the opening.

It is another object of the invention to provide a shield for weighing scales, in which an opening with a desired size can be formed without supporting any part of the shield, and both hands of a user become free.

In order to attain the aforesaid object, a roll-top shield for weighing scales according to the present invention comprises:

a stationary hood made of a transparent material and having a round top wall and right and left upright side walls, said top and side walls being composed to form a substantially n-shaped lower peripheral edge to be placed on a top surface of a weighing device;

a rotatable hood made of a transparent material and having a round top wall and right and left side walls, said top and side walls being coupled with each other to form first and second substantially n-shaped peripheral edges to be placed on the top surface of the weighing device; and right and left pins rotatably securing said right and left side walls of the rotatable hood to said right and left side walls of the stationary hood respectively, such that the rotatable hood is rotated between a closed position in which the first inverted U-shaped lower peripheral edge of the rotatable hood is placed on the top surface of the weighing device and form a substantially rectangular peripheral edge together with the substantially inverted U-shaped peripheral edge of the stationary hood to form a substantially sealed space surrounding a weighing dish of the weighing device, and an opened position in which the second substantially inverted U-shaped peripheral edge of the rotatable hood is placed on the top surface of the weighing device to form an opening through which an article to be weighed is put on and off the weighing dish of the weighing device.

DESCRIPTION OF THE PREFERRED EMBODIMENTS

Figure 1:
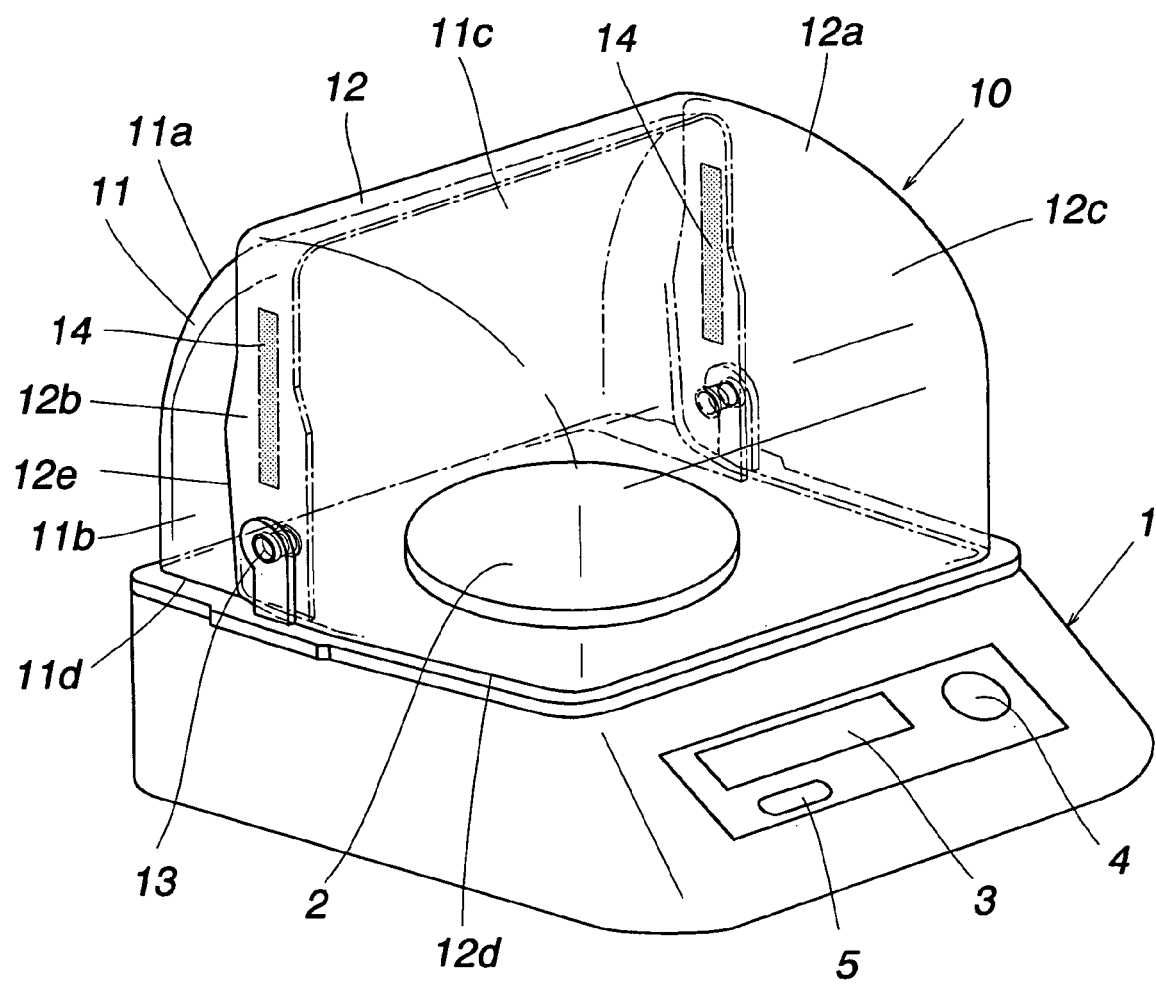
FIG. 1 is a perspective view illustrating an embodiment of the roll-top shield for weighing scales according to the invention.

Now the present invention will be explained in detail with reference to the embodiment shown in the drawings.

FIG. 1 is a perspective view showing an embodiment of the roll-top shield according to the invention placed on a top surface of a weighing device 1. The weighing device 1 includes a weighing dish 2 provided on the top surface, and further includes a liquid crystal panel 3 for displaying measured weights articles in digits, a measuring switch 4 for initiating the measurement and a power switch 5 all provided on a front panel. A roll-top shield 10 comprises a stationary hood 11 and a rotatable hood 12. The stationary hood 11 and rotatable hood 12 are made of a transparent material so that a user can see the inner side of the shield. For instance, the stationary hood 11 and rotatable hood 12 may be made of glass, anti-electric plastics or acrylic resin.

The stationary hood 11 of the roll-top shield 10 has a top wall 11a with a round surface and right and left side walls 11b, 11c and these top wall and side walls are coupled with each other to form a substantially inverted U-shaped lower peripheral edge 11d to be placed on the top surface of the weighing device 1. Similarly, the rotatable hood 12 has a top wall 12a with a round surface and right and left side walls 12b and 12c, and these walls are coupled with each other to form first and second substantially inverted U-shaped peripheral edges 12d and 12e. The right and left side walls 12b and 12c of the rotatable hood 12 are rotatably secured to the right and left side walls 11b and 11c of the stationary hood 11, respectively by means of right and left pins 13a and 13b, respectively extending in the horizontal direction. Therefore, the rotatable hood 12 can be rotated up and down over the stationary hood 11.

In FIG. 1, the rotatable hood 12 is in a closed position, in which the substantially inverted U-shaped peripheral edge 11d of the stationary hood 11 and the first substantially inverted U-shaped peripheral edge 12d of the rotatable hood 12 are placed on the top surface of the weighing device 1 such that these peripheral edges 11d and 12d form a substantially rectangular shape periphery corresponding to a rectangular shape of the top surface of the weighing device 1. Therefore, a large area can be covered with the shield 10. Furthermore, upon viewed in a horizontal direction, the stationary hood 11 and rotatable hood 12 form a substantially semi-cylinder having an axis extending in the horizontal direction. In this manner, the stationary hood 11 and rotatable hood 12 define a large space surrounding the weighing dish 2.

Figure 2:
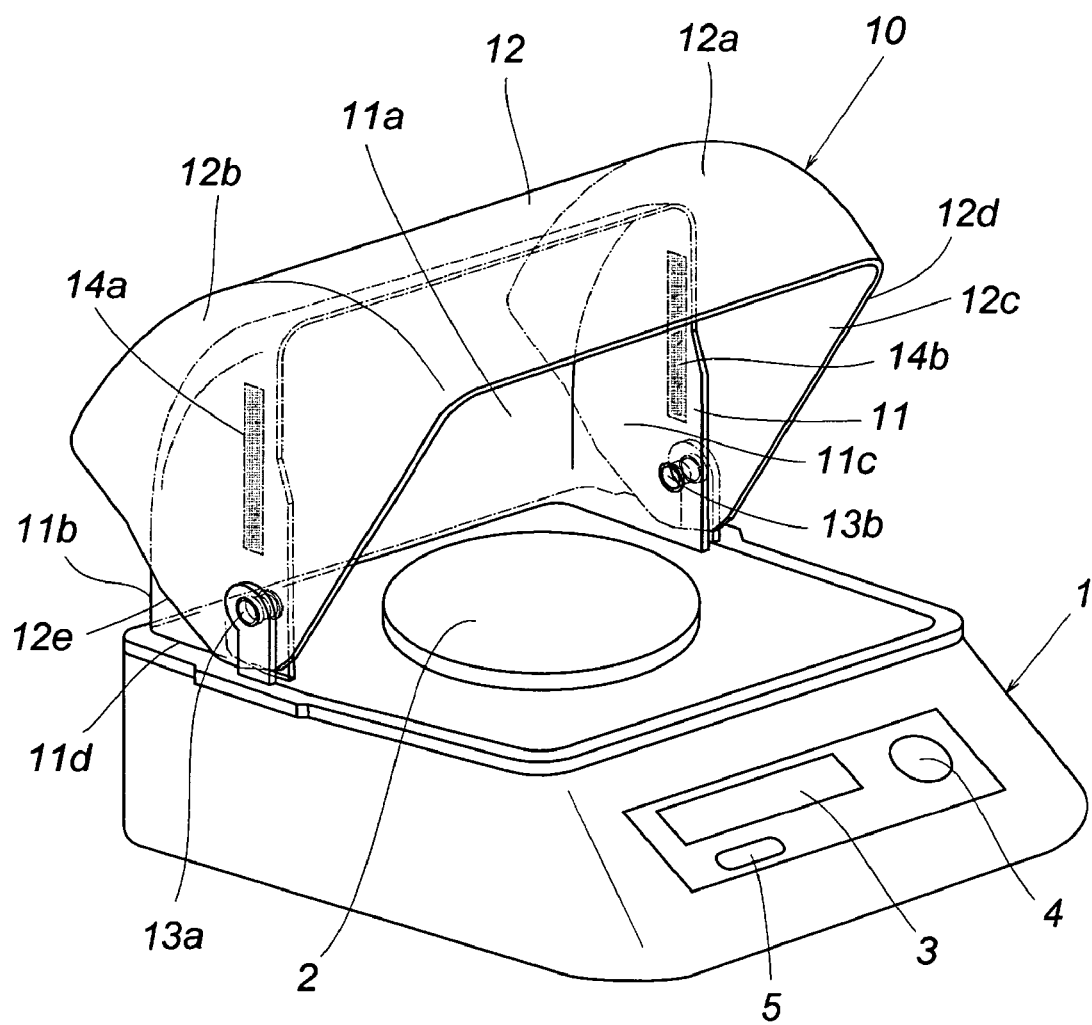
FIG. 2 is a perspective view showing the roll-top shield depicted in FIG. 1 in such a condition that a rotatable hood is rolled up halfway.

As explained above, when the rotatable hood 12 is rotated downward such that the first substantially inverted U-shaped peripheral edge 12d of the rotatable hood 12 is placed on the top surface of the weighing device 1 as shown in FIG. 1, the stationary hood 11 and rotatable hood 12 form a substantially closed space surrounding the weighing dish 2. It should be noted that this closed space has a substantially semi-cylindrical shape having an axis extending horizontally, and thus the closed space has a large volume. When the rotatable hood 12 is rotated upward as illustrated in FIG. 2, the top wall 12a of the rotatable hood 12 is overlapped with the top wall 11a of the stationary hood 11 to form an opening having a varying size. A size of the opening becomes maximum when the second substantially inverted U-shaped peripheral edge 12e of the rotatable hood 12 is placed on the top surface of the weighing device 1. In this condition, the weighing dish 2 becomes almost free from the shield 10 and an article to be measured can be very easily placed on and off the weighing dish 2 in front and back directions, right and left side directions and up and down directions.

In the present embodiment, the rotatable hood 12 can be stopped at any desired position between the closed position shown in FIG. 1 and the full opened position so that it is possible to obtain the opening having a desired size. For instance, when a small article is to be weighed, it is sufficient to form the opening having a small size, and in this case the rotatable hood 12 is not rotated into the full opened position. However, when an article to be measured is large or long, it is preferable to move the rotatable hood 12 into the full opened position. To this end, in the present embodiment, on outer surfaces of the right and left side walls 11b and 11c of the stationary hood 11 are applied by adhesive braking members 14a and 14b, respectively such that inner surfaces of the right and left side walls 12b and 12c of the rotatable hood 12 are brought into contact with the braking members 14a and 14b, respectively. Each of the braking members 14a and 14b is formed by a strip 14 made from a raised synthetic fiber. In this manner, the rotatable hood 12 can be stopped at any desired position to form the opening having a desired size without a need for holding the rotatable hood 12 with a hand. Therefore, user's both hands become free and this facilitates the handling of an article to be weighed.

The sealing capability of the roll-top shield is improved by providing the braking members 14a and 14b in a gap formed between the stationary hood 11 and the rotatable hood 12. From this point of view, according to the invention, the space between the stationary hood 11 and the rotatable hood 12 may be filled with the breaking members.

An article to be weighed is placed on the weighing dish 2, while the rotatable hood 12 has been moved into a suitable position to form the opening having a suitable size, and then the opening is closed by descending the rotatable hood 12 to shut down the air flow from the outside, the measuring switch 4 is pushed to initiate the measurement.

As mentioned above, the roll-top shield according to this invention can provide the opening having a large area by simply moving the rotatable hood and large or elongated articles can be easily put on and off the weighing dish through the opening. Moreover, the rotatable hood can be stopped at any desired position to obtain the opening having a desired size without holding the rotatable hood, both hands of a user become free and articles can be handled easily and safely with both hands.

What is claimed is:

1. A roll-top shield for weighing scales comprising:
   a stationary hood made of a transparent material and having a round top wall and right and left upright side walls, said top and side walls being composed to form a substantially inverted U-shaped lower peripheral edge to be placed on a top surface of a weighing device;
   a rotatable hood made of a transparent material and having a round top wall and right and left side walls, said top and side walls being coupled with each other to form first and second substantially inverted U-shaped peripheral edges to be placed on the top surface of the weighing device; and
   right and left pins for rotatably securing said right and left side walls of the rotatable hood to said right and left side walls of the stationary hood, respectively such that the rotatable hood is rotated between a closed position in which the first inverted U-shaped lower peripheral edge of the rotatable hood is placed on the top surface of the weighing device and form a substantially rectangular peripheral edge together with the substantially inverted U-shaped peripheral edge of the stationary hood to form a substantially sealed space surrounding a weighing dish of the weighing device, and an opened position in which the second substantially inverted U-shaped peripheral edge of the rotatable hood is placed on the top surface of the weighing device to form an opening through which an article to be weighed is put on and off the weighing dish of the weighing device.

2. The roll-top shield for weighing scales according to claim 1, further comprising right and left breaking members provided in a space between said right and left side walls of the stationary hood and said right and left side walls of the rotatable hood, respectively.

3. The roll-top shield for weighing scales according to claim 2, wherein each of said braking members consists of a strip comprising a raised synthetic fiber.

4. The roll-top shield for weighing scales according to claim 1, wherein the stationary hood and the rotatable hood are made of transparent glass or transparent synthetic plastics.

* * * * *